UNITED STATES PATENT OFFICE.

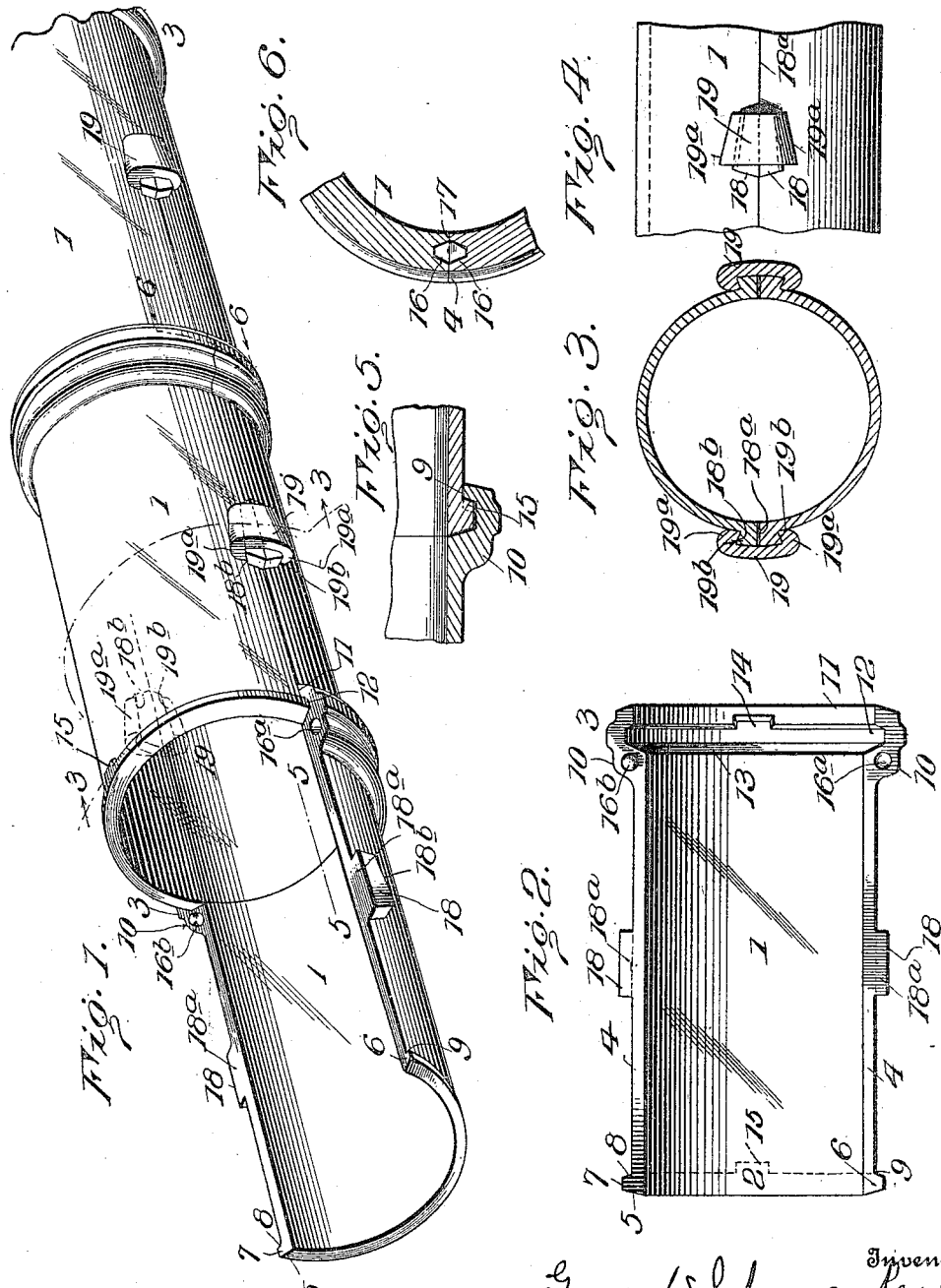

GERARD SCHUMACHER, OF ANNISTON, ALABAMA.

SECTIONAL CULVERT-PIPE AND THE LIKE.

1,225,867.  Specification of Letters Patent.  Patented May 15, 1917.

Application filed February 4, 1915. Serial No. 6,107.

*To all whom it may concern:*

Be it known that I, GERARD SCHUMACHER, a citizen of the United States, residing at Anniston, in the county of Calhoun and State of Alabama, have invented certain new and useful Improvements in Sectional Culvert-Pipes and the like, of which the following is a specification.

This invention relates to certain improvements in culvert and other pipes; and the objects and nature of the invention will be readily understood by those skilled in the art in the light of the following explanation of the accompanying drawings illustrating what I now believe to be the preferred embodiment from among other formations, arrangements and constructions within the spirit and scope of my invention.

An object of the invention is to provide an improved sectional cast metal pipe having means whereby the sections and lengths can be secured together against independent movement, and whereby the inner surface of the bore of the completed pipe will be smooth at the joints between the pipe lengths, and whereby danger of breakage of parts in handling and transportation will be reduced to the minimum.

A further object of the invention is to provide certain improvements in formation and arrangement for the production of a highly advantageous and efficient sectional culvert pipe.

The invention consists in certain novel features in construction and in arrangements and formation as hereinafter set forth more fully and particularly.

Referring to the accompanying drawings:—

Figure 1, is a perspective view of several sections of a culvert pipe constructed in accordance with my invention.

Fig. 2, is a plan view looking at the interior of one of the sections.

Fig. 3, is a cross section on the line 3—3, Fig. 1.

Fig. 4, is a detail elevation.

Fig. 5, is a detail longitudinal section on the line 5—5, Fig. 1.

Fig. 6, is a detail cross section.

The pipe of my invention is composed of similar pipe lengths each composed of longitudinal sections having a hub or bell end and a corresponding spigot end, the spigot end of each length adapted to interlock with the hub of the adjacent length against independent axial rotary movement and against longitudinal movement, and to form the bore of the pipe continuous, or smooth and free of obstructions across the joints between the pipe lengths. The longitudinal sections are free of lugs and other projections liable to be broken during handling and shipment, and these sections are formed with means whereby they can be conveniently locked together in pairs to form pipe lengths.

In the particular example illustrated, I show the pipe lengths composed of similar longitudinal sections capable of being cast in the same mold, although my invention is not so limited as the top sections can be of different cross sectional formation from the lower sections and yet embody some or all of the various features of my invention.

In the drawings, I show each pipe length composed of two similar longitudinal halves or cast iron sections 1, each having a spigot end 2, a hub or bell end 3, and flat parallel longitudinal edge faces 4, throughout the full length of the section including its said ends.

The spigot end of the section is formed with a beveled end edge 5, continuous from one longitudinal edge 4, to the other longitudinal edge 4, and this beveled edge forms the outer side face of a "double taper" rib 6, projecting from the exterior surface of the section and continuous between the edges 4, thereof. This exterior rib 6, is arranged at the extremity of the spigot end and is usually formed with a flat concentric outer edge face 7, and a tapered or beveled inner side face 8, so that the two side faces 5, 8, converge outwardly to meet the circumferential surface 7, while the beveled face 5, meets the inner surface of the section and constitutes spigot end edge of the section. The side face 8, meets the concentric semi-cylindrical exterior surface 9, of the section. The wall of the section is of increased thickness at 10, where the hub or bell 3, contracts to join the semi-cylindrical or other body wall of the section. The interior of the hub end is enlarged with respect to the interior of the body of the section and at its outer end portion provides the semi-cylindrical inner surface 11, to exteriorly fit the corresponding semi-cylindrical exterior portion 9, of the spigot end of the section fitting within said hub. The interior of the hub between the surface 11, and the interior surface of the body of the section, is formed with a groove or depression 12, continuous and of uniform depth from one edge 4, to the other edge 4, and of a cross sectional formation corresponding to the cross section formation of exterior rib 6. This groove is of the "double taper" formation, that is, the side walls are oppositely beveled or converge inwardly to the flat floor of the groove. The inner side wall 13, of the groove extends inwardly to meet the smooth cylindrical inner surface of the body of the section and hence forms the body with a beveled end edge surrounded by the hub or bell.

The hub and spigot ends of the section are thus formed to interlock with corresponding ends of contiguous sections to lock the sections together against longitudinal separation.

I also preferably provide exceedingly simple efficient means to hold the sections together against independent partial rotation or axial movement, and thereby maintain the sections of a row with their edge faces 4, level and in continuation. For instance, the interior of the hub end of each section can be formed with a central depression 14, formed by a lateral enlargement of the groove 12, and the spigot end of each section with a corresponding central exterior projection 15, formed by a lateral enlargement of the center of the rib 6. The projection 15, of a spigot end will fit the socket or depression of a hub end and thus prevent independent rotary or axial movement of either section, and yet these projections and depressions in no way detract from the centering fit of the ribs 6, in the grooves 12, and the close fit of long beveled end edges 5, with the corresponding edges 13, whereby in a complete pipe accurate joints are established between the sections with the inner surfaces of the spigot and hub ends of the sections flush so that the bore of the completed pipe is practically smooth and continuous across the joints between the pipe lengths. In order to properly center the upper sections on the lower sections and yet avoid the use of flanges and projecting cast pins and the like that are peculiarly subject to breakage while the sections are being handled and transported, I can form each section with rounded or tapered sockets or depressions 16, in the hub end of its flat top edges 4, particularly at the enlargements 10. These sockets can receive separate or loose double tapered or double cone dowel pins 17, to hold the two sections of a pipe length in alinement. If so desired, instead of employing separate pins 17, to enter sockets or depressions in both sections of a length, each section can have a rounded depression socket 16$^a$, formed in one edge 4, and a corresponding projection 16$^b$, rising from the other edge 4, and cast with the section. Hence when two sections are brought together to form a pipe length, the two pins 16$^b$, of the sections will enter the two depressions 16$^a$, of the sections.

In assembling the sections to form a complete pipe, particularly a drain or culvert pipe, the foundation is prepared and then the lower sections are properly arranged thereon. The spigot end of each section will drop into the hub end of the contiguous section and will be properly centered therein by the "double taper" rib and groove to provide the practically continuous unbroken smooth inner surface hereinbefore described. The projections 15, and depressions 14, will aline the sections laterally to render their flat comparatively wide top edge faces 4, level, continuous and alined throughout the trough formed by the sections. After the lower sections have thus been assembled, the separate pins 17, if employed, can be dropped into the sockets 16, and the upper sections are then assembled on the lower sections so that the pins 17, will enter the sockets of the upper sections and so that the flat faces 4, of the upper sections will rest on faces 4, of the lower sections. The pins 17 will accurately center each upper section on its lower section both longitudinally and laterally. In applying the upper sections, the hub of a section will be placed down over the spigot of a previously laid upper section, and the hubs and spigots will interlock as hereinbefore explained. If each section is cast with one pin 16$^b$, and a corresponding opposite depression 16$^a$, the upper sections will interlock with the lower sections through such sockets and fixed pins as hereinbefore set forth.

Inasmuch as it is usually desirable to lock the sections of a pipe length together against separation, I have provided exceedingly simple, durable, inexpensive and improved means for this purpose, consisting of longitudinal exterior lugs 18, integral with the sections, and separate clamps or keys 19, engaging the lugs of the two sections of a pipe length and locking such sections rigidly together. Each set of sections can be provided with any suitable number and arrangement of these lugs to receive any suitable number of clamps or keys 19, although in the example illustrated, I show each section provided with only two opposite lugs, so that but two clamps or keys will be required to lock the sections together, said clamps being located at the exterior of diametrically opposite portions of the pipe length and approximately midway between the ends thereof, although my invention is not so limited. Each section has these exterior lugs arranged adjacent the opposite longitudinal edges 4, each lug being longitudinally elongated with one longitudinal edge 18ª, flat and flush with the adjacent edge face 4, and the corresponding opposite edge 18ᵇ, longitudinally inclined to render the lug wedge-shaped, and transversely inclined to render the lug under cut or dovetailed.

These lugs are preferably formed by exterior lateral enlargements of the side edge portions of the section with their top edges forming flush lateral enlargements of the flat faces 4.

The form of the lugs is such as to render them exceedingly rigid and durable against breakage during handling and transportation.

When two sections are assembled the flat faces 4, of the sections and also the contiguous flat faces of said lugs squarely abut. The clamps lie against the flat outer faces of the lugs and bridge the joints between the sections and have opposite hooked ends 19ª, whose adjoining edges 19ᵇ, are dovetailed or undercut and longitudinally tapered or inclined to form a wedge-shaped space between said edges. Each pair of meeting lugs of the two assembled sections, forms a wedge-shaped block, and the sections are locked together by slipping one of the clamps longitudinally onto the small end of such block so that the undercut edges of the clamp catch under the undercut edges of such block, and then if need be tightening the clamp on the block by the necessary blows to draw the sections rigidly together. In this connection it will be noted that the lugs are braced against breakage when the clamp is being applied by abutting each other as hereinbefore described. The sections can be released to permit separation if need be, by loosening and removing the clamps which can be readily accomplished by tapping the same in the direction toward the small ends of the blocks formed by the lugs.

It is evident that various modifications and changes might be resorted to without departing from the spirit and scope of my invention and hence I do not wish to limit myself to the exact disclosure hereof.

What I claim is:

1. A pipe length having a spigot end formed with a double-taper continuous rib around its extremity, the annular end wall of said spigot end being beveled from the circumference of the rib to the inner surface of the pipe, the top and bottom portions of said rib being formed with lateral enlargements, said pipe length also having a hub end formed with a continuous internal V groove, the top and bottom portions of said groove having lateral enlargements, said pipe length being composed of upper and lower longitudinal sections having abutting longitudinal edges, the meeting sides of said sections having corresponding exterior under-cut longitudinally-inclined lugs adapted to form wedge-shaped blocks at the sides of the sections between their hub and spigot ends, and exterior clamping members adapted to embrace said blocks and wedge thereon longitudinally of the pipe sections to clamp said sections together, substantially as described.

2. A pipe length having a spigot end and a hub end, the spigot end at its extremity having an exterior rib, and the hub end having an interior groove to receive and center said rib of an adjoining pipe length and to form flush joints between the inner surfaces of adjoining pipe lengths, said length being composed of upper and lower longitudinal sections having meeting longitudinal edges, the rib of the lower section having a lug projecting laterally therefrom toward the hub end of the section and the groove of the lower section having a corresponding recess projecting laterally therefrom toward the outer end of the hub to receive the lug of the lower section of an adjoining pipe length for maintaining the upper longitudinal edges of said lower sections in alinement, substantially as described.

3. A pipe length having a spigot end and a hub end, the spigot end extremity having an exterior rib and the hub end having a corresponding internal groove, said length composed of upper and lower longitudinal sections having longitudinal meeting edges, said edges at the hub ends thereof having short tapered pins and corresponding sockets to interlock and hold the end edges of the sections in alinement, exterior means for clamping said sections together, the hub and spigot ends of the lower section formed with lateral recess 14, and lateral lug 15, to interlock with the corresponding portions of adjoining lower sections to hold said sections with their top longitudinal edges flush and in alinement.

4. A pipe length having a spigot end formed with a double-taper continuous rib around its extremity, the annular end wall of said spigot end being beveled from the circumference of the rib to the inner surface of the pipe, the top and bottom portions of said rib being formed with lateral enlargements, said pipe length also having a hub end formed with a continuous internal V groove, the top and bottom portions of said groove having lateral enlargements, said pipe length being composed of upper and lower longitudinal sections having abutting longitudinal edges, substantially as described.

In testimony whereof I affix my signature in presence of two witnesses.

GERARD SCHUMACHER.

Witnesses:
H. G. AURANT,
H. BROADAWAY.

Copies of this patent may be obtained for five cents each, by addressing the "Commissioner of Patents, Washington, D. C."